United States Patent [19]

Hattori et al.

[11] Patent Number: 5,218,081
[45] Date of Patent: Jun. 8, 1993

[54] METHOD OF PRODUCING AROMATIC POLYTHIAZOLE

[75] Inventors: Tatsuya Hattori, Tokyo; Hiroshi Akita, Asaka; Yoshio Imai, Tokyo; Masaaki Kakimoto, Yokohama, all of Japan

[73] Assignee: Honda Giken Kogyo Kabushiki Kaisha, Tokyo, Japan

[21] Appl. No.: 657,993

[22] Filed: Feb. 20, 1991

[30] Foreign Application Priority Data

May 15, 1990 [JP] Japan .................... 2-125154

[51] Int. Cl.$^5$ ............................. C08G 75/32
[52] U.S. Cl. .................... 528/337; 528/183; 528/336
[58] Field of Search .............. 528/337, 183, 336

[56] References Cited

U.S. PATENT DOCUMENTS 4,622,285 11/1986 Ahne .

FOREIGN PATENT DOCUMENTS 1-311127 12/1989 Japan .
2-103230 4/1990 Japan .

OTHER PUBLICATIONS

Makromolekulare Chemei, vol. 191, No. 9, pp. 2017-2026, 1990.

Primary Examiner—Harold D. Anderson
Attorney, Agent, or Firm—Birch, Stewart, Kolasch & Birch

[57] ABSTRACT

An aromatic polythiazole is produced from a salt of an aromatic diaminodithiol compound and a dicarboxylic acid derivative, by a method comprising the steps of: (a) reacting the aromatic diaminodithiol compound salt with an alkyl halide having a substituted or unsubstituted alkyl group in an alkaline aqueous solvent, so that hydrogen atoms in thiol groups of the aromatic diaminodithiol compound are substituted with the alkyl groups; (b) polymerizing the resulting alkyl group-substituted aromatic diaminodithiol compound with the dicarboxylic acid derivative to form an aromatic polythiazole prepolymer; and (c) heating the aromatic polythiazole prepolymer to cause a thiazole ring closure reaction, thereby producing the aromatic polythiazole. By this method, the amino groups of the aromatic diaminodithiol compound salt are selectively reacted with the dicarboxylic acid derivative.

12 Claims, 3 Drawing Sheets

METHOD OF PRODUCING AROMATIC POLYTHIAZOLE

BACKGROUND OF THE INVENTION

The present invention relates to a method of producing an aromatic polythiazole which is a rigid aromatic polymer having excellent heat resistance, mechanical properties, chemical resistance, electric properties, etc., particularly to a method of producing an aromatic polythiazole by using a usual organic solvent at a sufficiently low temperature.

Polymers having in their repeating units heterocyclic rings such as a thiazole ring, an imidazole ring, an oxazole ring, an oxazinone ring, etc. have been attracting much attention as high-strength, high-modulus, high-heat resistance polymers with high rigidity.

Among them, an aromatic polythiazole having a thiazole ring is expected to be used alone or in combination with other engineering plastics as a plastic material substitutable for metal materials.

However, since the aromatic diaminodithiol compound generally has a poor solubility in organic solvents, etc. due to its high rigidity, it is soluble only in limited kinds of strong acids such as metasulfonic acid, chlorosulfonic acid, etc. Accordingly, the molding of the aromatic diaminodithiol compound has been difficult.

The aromatic polythiazole is conventionally produced from an aromatic diaminodithiol compound and a dicarboxylic acid derivative, particularly its chloride, but once formed, its molding is generally difficult as mentioned above. Thus, it is general to produce an aromatic polythiazole prepolymer first and then to conduct its ring closure reaction to form an aromatic polythiazole. Since the aromatic polythiazole prepolymer is soluble in an organic solvent, by conducting the thiazole ring closure reaction after molding at the stage of a prepolymer, the difficulty of its molding can be avoided. As a result, formed products of the aromatic polythiazole having desired shapes can be obtained.

In the meantime, the prepolymer of an aromatic polythiazole has generally been produced by heating a mixture of an aromatic diaminodithiol compound or its salts and a dicarboxylic acid or its derivatives at a temperature of 160° C. or higher in the presence of polyphosphoric acids, etc. However, in this case, it is difficult to control the polymerization reaction by heating in the presence of polyphosphoric acids. Thus, the polymerization reaction often proceeds to form a polythiazole. Therefore, various attempts have been made to provide the prepolymer of aromatic polythiazole.

Japanese Patent Laid-Open No. 60-223824 discloses a method of producing a polythiazole prepolymer by reacting an aromatic and/or heterocyclic diaminodithiol compound with a dicarboxylic acid in the presence of a carbodiimide.

However, since the above reaction is carried out in the presence of a carbodiimide, the actually formed polythiazole prepolymer has a low molecular weight only suitable for photoresists, despite the description that the reaction proceeds at such a temperature that the prepolymer is not converted to inactive ring-closed products. The above low-molecular weight prepolymer is not suitable as a prepolymer for high-strength polymers which are to be used in molecular composite materials.

In these circumstances, the applicant previously filed a patent application (Japanese Patent Application No. 63-136733) in Japan for a method of producing an aromatic polythiazole prepolymer, in which an aromatic diaminodithiol compound or its salt is polymerized with a dicarboxylic acid derivative by an interfacial polymerization method, and a patent application (Japanese Patent Application No. 63-140807) for a method of polymerizing an aromatic diaminodithiol compound salt with a dicarboxylic acid derivative in the presence of a phosphoric acid compound at a temperature of 70°–140° C.

The above methods can stably produce an aromatic polythiazole prepolymer more efficiently than any other conventional methods. However, in these methods, thiol groups of the aromatic diaminodithiol compound or its salt as a starting material are likely to react with the dicarboxylic acid derivative, and the thiol groups are partially subjected to a ring closure reaction in the process of forming the prepolymer, thereby producing insoluble components.

OBJECT AND SUMMARY OF THE INVENTION

Accordingly, an object of the present invention is to provide a method of stably and efficiently producing a prepolymer of an aromatic polythiazole which is then converted to a rigid, high-strength aromatic polythiazole having excellent mechanical strength.

As a result of intense research in view of the above object, the inventors have found that by using an aromatic diaminodithiol compound having thio groups whose hydrogen atoms are substituted by substituted or unsubstituted alkyl groups for the synthesis of an aromatic polythiazole prepolymer, this prepolymer can be stably and efficiently produced, and that an aromatic polythiazole having excellent physical and chemical properties can be produced by heating this prepolymer at an appropriate temperature. The present invention has been completed based upon this finding.

Thus, the method of producing an aromatic polythiazole from a salt of an aromatic diaminodithiol compound and a dicarboxylic acid derivative according to the present invention, comprises the steps of:

(a) reacting the aromatic diaminodithiol compound salt with an alkyl halide having a substituted or unsubstituted alkyl group in an alkaline aqueous solvent, so that hydrogen atoms in thiol groups of the aromatic diaminodithiol compound are substituted with the alkyl groups;

(b) polymerizing the resulting alkyl group-substituted aromatic diaminodithiol compound with the dicarboxylic acid derivative to form an aromatic polythiazole prepolymer; and (c) heating the aromatic polythiazole prepolymer to cause a thiazole ring closure reaction, thereby producing the aromatic polythiazole.

DETAILED DESCRIPTION OF THE INVENTION

The present invention will be explained in detail below.

The aromatic diaminodithiol compound used in the form of a salt in the present invention is a compound having amino groups and thiol groups on both sides of its aromatic residual group, and the aromatic residual group may be not only a benzene ring but also any aromatic ring in which 2 or more benzene rings are condensed. Further, the aromatic residual group may be those having 2 or more benzene rings bonded to each other, such as biphenyl. The amino groups and the thiol groups on both sides may be bonded to the aromatic residual group symmetrically with respect to its axis or its central point. Typical examples of such aromatic diaminodithiol compounds are:

These aromatic diaminodithiol compounds are used in the form of a salt such as a hydrochloride to prevent their deterioration.

The alkyl groups bonded to the thiol groups of the aromatic diaminodithiol compound are substituted or unsubstituted alkyl groups. The unsubstituted alkyl groups include an isopropyl group, an ethyl group, an n-propyl group, an n-butyl group, a sec-butyl group, a tert-butyl group, etc. Among them, secondary or tertiary alkyl groups are particularly preferable.

The substituted alkyl groups include alkyl groups substituted with a carboxyl group, an ester group, a cyano group, a benzene group, etc. Incidentally, in the case of having such substituent groups, the alkyl groups need not be secondary ones. The substituted alkyl groups include specifically:

Incidentally, with respect to the first two alkyl groups among the above six substituted alkyl groups, alkyl groups bonded to an oxygen atom in the ester bond need not be a methyl group, and they may be longer linear alkyl groups.

Particularly when the hydrogen atoms in the thiol groups of the aromatic diaminodithiol compound are substituted with alkyl groups having a cyano group or an ester group, the resulting prepolymer can be subjected to a ring closure reaction at such a low temperature as 250°–400° C. In addition, the resulting prepolymer can be easily dissolved in an organic solvent such as N-methyl-2-pyrrolidone, etc.

By selecting an alkyl group having a proper length of a carbon chain (carbon number: about 2–5), the aromatic polythiazole prepolymer produced by this method can be used for the production of molecular composite materials having excellent physical and chemical properties as described below. Incidentally, the term "molecular composite material" means a composite polymer blend in which the polythiazole is finely dispersed in a matrix polymer to a molecular level. This composite material can be obtained by a ring closure reaction by heating a blend of the aromatic polythiazole prepolymer and the matrix resin.

The above alkyl group is used in the form of a halide, namely an alkyl halide. The halides which may be used in the present invention are bromides, chlorides, iodides, etc. of the above alkyl groups.

The dicarboxylic acid derivatives used in the present invention include those having carboxylic groups substituted as follows:

The residual groups of the above dicarboxylic acid derivatives are preferably aromatic groups, and their specific examples are as follows:

Preferred among them is terephthalic acid. Incidentally, the dicarboxylic acid derivative may be used alone or in combination.

Next, the production of the aromatic polythiazole will be explained below.

The method of the present invention comprises the following three steps:

(a) Reacting the aromatic diaminodithiol compound salt with an alkyl halide having a substituted or unsubstituted alkyl group in an alkaline aqueous solvent, so that hydrogen atoms in thiol groups of the aromatic diaminodithiol compound are substituted with the alkyl group;

(b) Polymerizing the resulting alkyl group-substituted aromatic diaminodithiol compound with the dicarboxylic acid derivative to form an aromatic polythiazole prepolymer; and (c) Heating the aromatic polythiazole prepolymer to cause a thiazole ring closure reaction, thereby producing the aromatic polythiazole.

The above steps will be explained below.

In the step (a), the aromatic diaminodithiol compound salt is reacted with an alkyl halide in an alkaline aqueous solvent. The alkaline aqueous solvent used may be water or a mixture of water and alcohol (ethanol and/or methanol) in which an alkaline salt such as sodium hydroxide is dissolved. By using an alkaline aqueous solvent, the aromatic diaminodithiol compound salt can be easily dissolved, while increasing a nucleophilic nature of the thiol groups. This accelerates the substitution reaction of hydrogen atoms in the thiol groups with the substituted or unsubstituted alkyl group. Incidentally, the alkali concentration in the alkaline aqueous solvent is preferably 30 weight % or less.

The substitution reaction can be conducted at a temperature of 0°-100° C. When the substitution temperature is lower than 0° C., the substitution reaction rate is too small. On the other hand, when it exceeds 100° C., a secondary reaction is likely to take place. The preferred reaction temperature is 0°-95° C.

The reaction time is not specifically restricted, but it is generally about 2-24 hours.

Incidentally, to accelerate the substitution reaction, the solution is preferably stirred. Also, by using an excess amount of an alkyl halide, the reaction rate can be increased.

Further, by adding cetyl trimethyl ammonium chloride, n-butyl triphenyl phosphonium bromide, tetraphenyl phosphonium bromide, 18-crown-6, etc. as a phase transfer catalyst, the reaction between the aromatic diaminodithiol compound salt and the alkyl halide can be accelerated.

By conducting the substitution reaction under the above conditions, the hydrogen atoms in the thiol groups of the aromatic diaminodithiol compound salt can be substituted with the alkyl groups.

In the reaction of this step (a), the reaction of the aromatic diaminodithiol compound salt and the alkyl halide proceeds as follows. Here, the aromatic diaminodithiol compound salt is exemplified by 2,5-diamino-1,4-benzenethiol dichloride.

wherein X—R represents an alkyl halide.

In the step (b), the monomer obtained in the step (a) is polymerized with the dicarboxylic acid derivative to synthesize an aromatic polythiazole prepolymer. In this case, the monomer obtained in the step (a) and the dicarboxylic acid derivative are mixed in an equimolar ratio, and subjected to polymerization under the conditions as described below.

The solvents which may be used in the reaction are N-methyl-2-pyrrolidone, hexamethyl phosphoric triamide, N,N-dimethyl acetamide, etc., which may be used alone or in combination. To increase their reactivity, chlorides such as LiCl, CaCl$_2$, etc. may be added in an amount up to 5%.

The monomer obtained in the step (a) and the dicarboxylic acid derivative are dissolved in the above solvent in an equimolar ratio, and subjected to a polymerization reaction at a temperature between −20° C. and +50° C. When the polymerization temperature is lower than −20° C., a sufficient polymerization reaction does not take place. On the other hand, when it exceeds +50° C., the resulting prepolymer has a low polymerization degree. Incidentally, when it exceeds +100° C., the thiazole ring closure reaction is likely to place. Accordingly, the possible polymerization temperature range is −20° C. to +100° C. The preferred polymerization temperature is between −20° C. and +30° C.

The monomer concentration is preferably about 0.1-2 mol/l. When the monomer concentration exceeds 2 mol/l, the monomer cannot completely be dissolved.

In the polymerization reaction in the step (b), the solution is preferably stirred to increase the polymerization reaction rate. The polymerization reaction time is not particularly restricted, but it is generally about 1-24 hours.

By the polymerization reaction under the above conditions, the aromatic polythiazole prepolymer having a large polymerization degree can be obtained without causing a ring closure reaction. The resulting aromatic polythiazole prepolymer has an intrinsic viscosity $\eta_{inh}$ of about 1.0-1.7 (in N-methyl-2-pyrrolidone, 30° C.).

In the polymerization reaction in the step (b), the reaction between the monomer obtained in the step (a) and the dicarboxylic acid derivative proceeds as follows. Here, the monomer obtained in the step (a) is exemplified by 2,5-diamino-1,4-benzenethiol dichloride substituted with alkyl groups, and the dicarboxylic acid derivative is exemplified by terephthalic acid dichloride.

wherein n represents a degree of polymerization.

Incidentally, when the polymerization reaction is conducted by using two dicarboxylic acid derivatives, a prepolymer in the form of a copolymer as described below can be obtained.

wherein Ar and Ar' respectively represent aromatic groups of the dicarboxylic acids, and m and n represent the numbers of repeating units (polymerization degree).

The resulting aromatic polythiazole prepolymer is washed and dried by a known method.

Next, in the step (c), the prepolymer is heated to remove the alkyl group (R) from the prepolymer, thereby forming a thiazole ring at that site. As a result, an aromatic polythiazole can be produced. When the aromatic polythiazole prepolymer obtained by the reaction (2) is used as a prepolymer, the poly-p-phenylenebenzobisthiazole having the following structure can be obtained.

The ring closure reaction of the prepolymer is conducted by heating at 250°–500° C. When the heating temperature is lower than 250° C., the thiazole ring cannot be formed. On the other hand, when heated at a temperature exceeding 600° C., the polythiazole is likely to decomposed. In view of this fact, the upper limit of the heating temperature is preferably restricted to 500° C. In the case of using a prepolymer obtained from an alkyl group-substituted aromatic diaminodithiol compound in which the hydrogen atoms of thiol groups are substituted with alkyl groups having a carboxylic group, a cyano group, an ester group, etc., the ring closure reaction can be conducted at such a low temperature as 250°–400° C.

Incidentally, in the production of the molecular composite material comprising the aromatic polythiazole produced by the method of the present invention, it is preferable to mix the aromatic polythiazole at the stage of a prepolymer with a matrix resin in an organic solvent, rather than mixing the polythiazole formed in advance with the matrix resin. After uniformly dispersing the aromatic polythiazole prepolymer in the matrix resin, the solvent is removed by heating and then the ring closure reaction of the prepolymer is caused. Accordingly, it is necessary that the prepolymer has a good solubility in the organic solvent used. The prepolymers having thiol groups to which the above-described alkyl groups having the above-described length are bonded show good solubility in an organic solvent.

With respect to the matrix resin for the molecular composite materials, aromatic polyamides, polyamide acids produced from diamines and acid anhydrides, polyimides, etc. are preferable.

A solution of the prepolymer substituted with the above-described alkyl group shows a large degree of a liquid crystal property, so that the spinning of the prepolymer from its solution in the organic solvent is easily carried out. Accordingly, polythiazole fibers can be easily produced by using the method of the present invention. To increase the liquid crystal property of the prepolymer solution, the alkyl group bonded to the thiol groups should be longer. However, taking into consideration the solubility of the prepolymer in an organic solvent, an alkyl group having a proper length should be selected.

According to the present invention, by using an aromatic diaminodithiol compound salt having thiol groups whose hydrogen atoms are substituted with alkyl groups in advance and by polymerizing it with a dicarboxylic acid derivative, the amino groups of the aromatic diaminodithiol compound are selectively reacted with the dicarboxylic acid derivative. In this case, since the thiol groups are protected by the alkyl groups, they do not constitute polymerization sites.

Also, since the aromatic diaminodithiol compound used has thiol groups whose hydrogen atoms are substituted with the alkyl groups, its polymerization reaction with the dicarboxylic acid derivative can be conducted at a lower temperature than in the conventional methods. This makes it less likely to cause a thiazole ring closure reaction in the production process of the prepolymer. Particularly, by using secondary alkyl groups, the substitution reaction becomes easy, and the alkyl groups are easily removed at the time of heating the prepolymer. As a result, the formation of thiazole rings becomes easy. In addition, by using alkyl groups having a carboxyl group, an ester group, a cyano group and a benzyl group, etc., the ring closure reaction of the prepolymer can be achieved at an extremely low temperature. Since the prepolymer having alkyl groups substituted with these groups are extremely soluble in organic solvents such as N-methyl-2-pyrrolidone, etc., the polythiazole can be produced without using strong acids.

The present invention will be described in further detail by way of the following Examples.

EXAMPLE 1

(1) Synthesis of Monomer for Producing Prepolymer 21.6 g of sodium hydroxide was dissolved in 300 ml of distilled water, and 30.0 g of 2,5-diamino-1,4-benzenethiol dichloride was added and dissolved in the resulting sodium hydroxide solution while stirring and cooling it to 0° C. by ice water.

Dropped into the resulting solution while stirring was 29.4 ml of methyl 3-bromopropionate. In the course of dropping this methyl 3-bromopropionate, 3.0 g of cetyl trimethyl ammonium chloride was added. By dropping cetyl trimethyl ammonium chloride, precipitation took place immediately. While continuing the stirring of the solution, the solution was gradually heated to room temperature.

3 hours after keeping the solution at room temperature, the resulting reaction product was subjected to suction filtration by a glass filter, and a precipitate was sufficiently washed with distilled water. After washing, it was dried at 60° C. in vacuum. As a result, a yellowish solid material was obtained at a yield of 23.6 g. The resulting solid was subjected to a recrystallization treatment by cyclohexane to obtain a yellowish needle crystal which was dried in vacuum.

The resulting crystal material had a melting point of 84° C. Also, as a result of elemental analysis, the following data were obtained. Incidentally, the numerals in the table below are expressed by percentage.

| Elemental Analysis: $C_{14}H_{20}N_2S_2O_4$ | | | | |
|---|---|---|---|---|
| Element | C | H | N | S |
| Calculation | 48.82 | 5.85 | 8.13 | 18.62 |
| Measurement | 48.96 | 5.97 | 7.92 | 18.20 |

Further, as a result of $^1$H-NMR measurement, single peaks were observed at 3.7 ppm and 6.8 ppm, respectively.

It was confirmed by the above analyses that the resulting crystal material had the following structure:

(2) Synthesis of Poly-p-Phenylenebenzobisthiazole Prepolymer 0.7000 g of the crystal (monomer) obtained in the above step (1) was dissolved in 4 ml of an N-methyl-2-pyrrolidone (NMP) solution having a lithium chloride concentration of 5.0 weight %.

This solution was cooled in a dry ice/ice water bath, and 0.4126 g of terephthalic acid chloride was added.

The solution was gradually heated to 0° C. while stirring and kept at 0° C. After the solution became cloudy, a solvent (NMP containing lithium chloride) was added, and the stirring was continued to keep a uniform solution.

When the solution became viscous, showing an intrinsic viscosity $\eta_{inh}$ of about 1.0, the solution was gradually heated to room temperature. 3 hours after introducing terephthalic acid chloride, the solution was slowly poured to methanol while stirring. After stirring for 30 minutes, filtration was conducted, and reflux was then conducted by using a water-methanol solution overnight to remove the solvent.

The resulting polymer was dried at 100° C. for 24 hours in vacuum. Its yield was 0.94 g, amounting to 97%.

This polymer had an intrinsic viscosity $\eta_{inh}$ of 1.90 (dl/g). Incidentally, the measurement of an intrinsic viscosity was conducted in NMP having a lithium chloride concentration of 5% at a polymer concentration of 0.5 g/dl at 30° C. by an Ubbelode's viscometer.

Next, the elemental analysis of this polymer was conducted. The results are shown below.

| Elemental Analysis: $C_{22}H_{22}N_2S_2O_6$ | | | | |
|---|---|---|---|---|
| Element | C | H | N | S |
| Calculation | 55.68 | 4.67 | 5.90 | 13.51 |
| Measurement | 55.64 | 4.65 | 5.90 | 13.51 |

From the above results, this polymer was identified as a prepolymer of poly-p-phenylenebenzobisthiazole, hydrogen atoms of whose thiol groups were substituted by methyl propionate groups.

(3) Ring Closure Reaction to Poly-p-Phenylenebenzobisthiazole

The prepolymer obtained in the step (2) was heated at 350° C. for 30 minutes in a nitrogen gas atmosphere.

After heating, the polymer was subjected to an infrared (IR) spectroscopic analysis. The IR chart obtained was compared to that of poly-p-phenylenebenzobisthiazole produced by a polyphosphoric acid method, and it was noted that the both charts were substantially the same. It was thus confirmed that the prepolymer obtained in the step (2) was subjected to a ring closure reaction by heating at 350° C. for 30 minutes to form poly-p-phenylenebenzobisthiazole.

EXAMPLE 2

(1) Synthesis of Monomer for Producing Prepolymer 21.6 g of sodium hydroxide was dissolved in 300 ml of distilled water, and 30.0 g of 2,5-diamino-1,4-benzenethiol dichloride was added and dissolved in the resulting sodium hydroxide solution while stirring and cooling it to 0° C. by ice water.

Dropped into the resulting solution while stirring was 22.4 ml of 3-bromopropiononitrile. In the course of dropping this 3-bromopropiononitrile, 3.0 g of cetyl trimethyl ammonium chloride was added. By dropping cetyl trimethyl ammonium chloride, precipitation took place immediately. While continuing the stirring of the solution, the solution was gradually heated to room temperature.

4 hours after keeping the solution at room temperature, the resulting reaction product was subjected to suction filtration by a glass filter, and a precipitate was sufficiently washed with distilled water. After washing, it was dried at 60° C. in vacuum. As a result, a yellowish solid material was obtained at a yield of 51.3 g. The resulting solid was subjected to a recrystallization treatment by methylene chloride to obtain a yellowish crystal which was dried in vacuum.

The resulting crystal material had a melting point of 130° C. Also, as a result of elemental analysis, the following data were obtained.

| Elemental Analysis: $C_{12}H_{14}N_4S_2$ | | | | |
|---|---|---|---|---|
| Element | C | H | N | S |
| Calculation | 51.77 | 5.07 | 20.12 | 23.04 |
| Measurement | 51.70 | 5.01 | 20.02 | 23.14 |

Further, as a result of $^1$H-NMR measurement, triplet peaks were observed at 2.97 ppm and 2.67 ppm, respectively, and single peaks were observed at 4.63 ppm and 6.79 ppm, respectively.

It was confirmed by the above analyses that the resulting crystal material had the following structure:

(2) Synthesis of Poly-p-Phenylenebenzobisthiazole Prepolymer 1.3920 g of the compound (monomer) obtained in the above step (1) was dissolved in 10 ml of an N-methyl-2-pyrrolidone solution having a lithium chloride concentration of 5.0 weight %.

This solution was cooled in a salt/ice water bath, and 1.0151 g of terephthalic acid dichloride was added. The solution was gradually heated to 0° C. while stirring and kept at 0° C. After the solution became cloudy, a solvent (NMP containing lithium chloride) was added, and the stirring was continued to keep a uniform solution.

When the solution became viscous, showing an intrinsic viscosity $\eta_{inh}$ of about 1.0, the solution was gradually heated to room temperature. 3 hours after introducing terephthalic acid chloride, the solution was slowly poured to methanol while stirring. After stirring for 30 minutes, filtration was conducted, and reflux was then conducted by using a methanol aqueous solution overnight to remove the solvent.

The resulting polymer was dried at 100° C. for 24 hours in vacuum. Its yield was 2.03 g, amounting to 99.5%.

This polymer had an intrinsic viscosity $\eta_{inh}$ of 1.81 (dl/g). Incidentally, the measurement of an intrinsic viscosity was conducted in NMP having a lithium chloride concentration of 5% at a polymer concentration of 0.5 g/dl by an Ubbelode's viscometer.

Next, the elemental analysis of this polymer was conducted. The results are shown below.

| Elemental Analysis: $C_{20}H_{16}N_4S_2$ | | | | |
|---|---|---|---|---|
| Element | C | H | N | S |
| Calculation | 58.80 | 3.95 | 13.72 | 15.70 |
| Measurement | 58.63 | 3.87 | 13.51 | 15.55 |

From the above results, this polymer was identified as a prepolymer of poly-p-phenylenebenzobisthiazole, hydrogen atoms of whose thiol groups were substituted by 3-bromopropiononitrile groups.

(3) Ring Closure Reaction to Poly-p-Phenylenebenzobisthiazole

The prepolymer obtained in the step (2) was heated at 350° C. for 30 minutes in a nitrogen gas atmosphere.

After heating, the polymer was subjected to an infrared (IR) spectroscopic analysis. The IR chart obtained was compared to that of poly-p-phenylenebenzobisthiazole produced by a polyphosphoric acid method, and it was noted that both charts were substantially the same. It was thus confirmed that the prepolymer obtained in the step (2) was subjected to a ring closure reaction by heating at 350° C. for 30 minutes to form poly-p-phenylenebenzobisthiazole.

EXAMPLE 3

(1) Synthesis of 2,5-Diamino-1,4-Diisopropylthiobenzene 14.4 g of sodium hydroxide, 200 ml of distilled water and 4.4 g of cetyl trimethyl ammonium chloride were introduced into a three-neck flask, and stirred in a nitrogen stream. 20.0 g of 2,5-diamino-1,4-benzenethiol dichloride was added thereto, and stirred until a uniform solution was obtained.

The resulting solution was cooled to 0° C. by ice water, and 23.0 ml of isopropyl bromide was dropped into the solution. After dropping, the solution was heated to room temperature while stirring.

The resulting reaction product was isolated by suction filtration with a glass filter, and the resulting precipitate was sufficiently washed with distilled water. After washing, it was dried at room temperature and in vacuum, and further dried at 150° C. in a reduced pressure of 1 mmHg. A solid thus obtained was subjected to a recrystallization treatment twice by using n-hexane. As a result, a yellowish needle crystal substance was obtained. The resulting crystal substance was dried in vacuum. Its yield was 10.3 g.

As a result of elemental analysis and $^1$H-NMR measurement using CDCl$_3$, the following data were obtained.

| Elemental Analysis: $C_{12}H_{20}N_2S_2$ | | | | |
|---|---|---|---|---|
| Element | C | H | N | S |
| Calculation | 56.21 | 7.86 | 10.92 | 25.01 |
| Measurement | 56.12 | 8.02 | 10.95 | 24.79 |

$^1$H-NMR (CDCl$_3$): 1.26 ppm; 3.24 ppm; 3.79 ppm; 6.84 ppm.

From the above results, this polymer was identified 2,5-diamino-1,4-diisopropylthiobenzene.

(2) Synthesis of Poly-p-Phenylenebenzobisthiazole Prepolymer

Hexamethyl phosphoric amide (HMPA) and N-methyl-2-pyrrolidone (NMP) were mixed at a volume ratio of 2:1, and lithium chloride was added thereto such that a lithium chloride concentration in the solvent was 3.5 weight %.

0.5000 g of the compound obtained in the step (1) was added to 7.6 ml of this solvent at room temperature.

The resulting solution was cooled by a dry ice/acetone mixture, and 0.3958 g of terephthalic acid chloride was added thereto. The solution was gradually heated to 0° C. while stirring and kept at 0° C. After the solution became cloudy, a solvent (NMP containing lithium chloride) was added, and the stirring was continued to keep a uniform solution.

When the solution became viscous, showing an intrinsic viscosity $\eta_{inh}$ of about 1.0, the solution was gradually heated to room temperature. 3 hours after introducing terephthalic acid chloride, the solution was slowly poured to methanol while stirring. After stirring for 30 minutes, filtration was conducted, and reflux was then conducted by using a water-methanol solution for about 2 hours to remove the solvent.

The resulting polymer was dried at 100° C. for 24 hours in vacuum. Its yield was 0.75 g, amounting to 100%.

This polymer was subjected to an IR measurement. The results are shown in FIG. 1.

Figure 1:
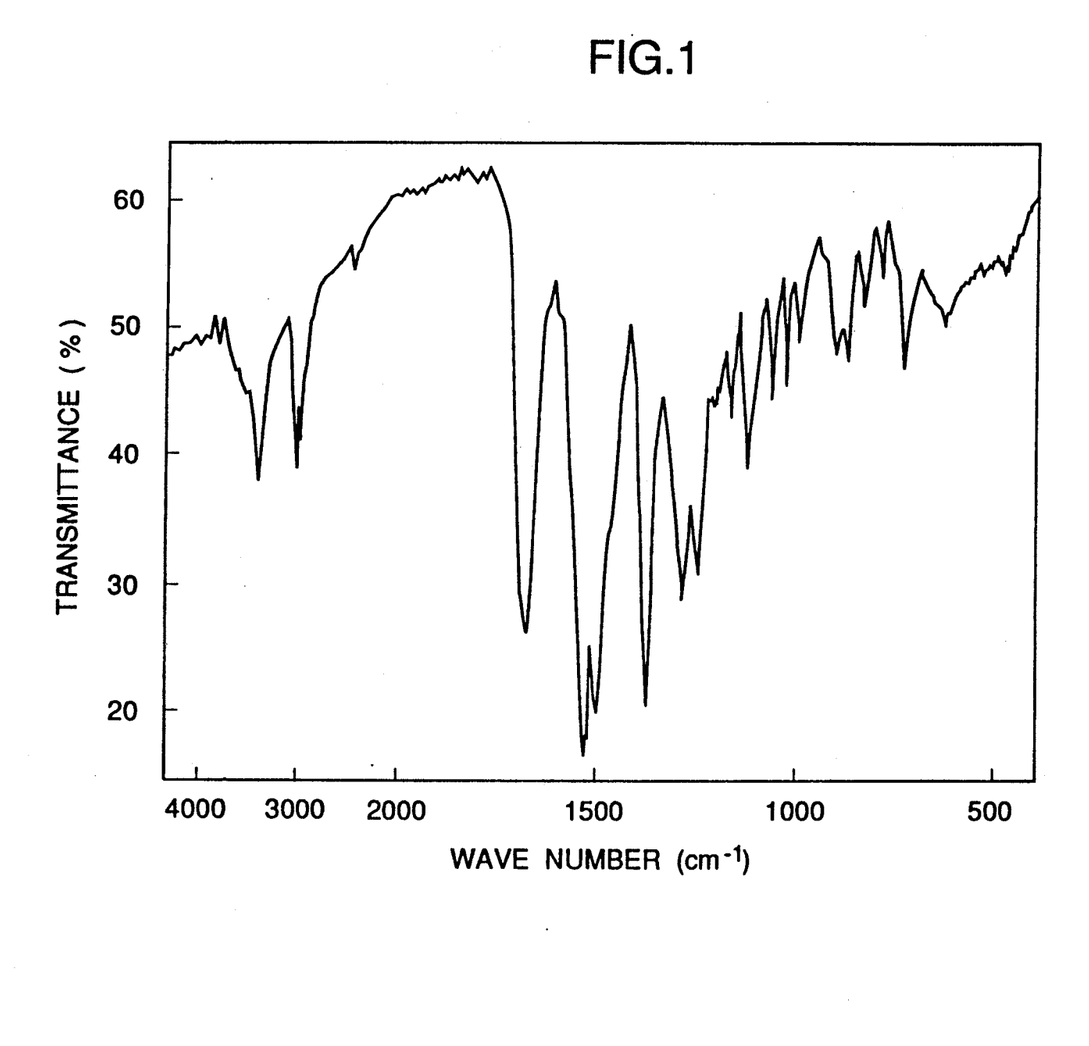
FIG. 1 is a chart showing the infrared spectrum of the product obtained by a polymerization reaction between an alkyl group-substituted aromatic diaminodithiol compound and a dicarboxylic acid derivative in Example 3.

From the results in FIG. 1, this polymer was identified as a prepolymer of poly-p-phenylenebenzobisthiazole having thiol groups whose hydrogen atoms were substituted by isopropyl groups.

(3) Ring Closure Reaction to Poly-p-Phenylenebenzobisthiazole

The prepolymer obtained in the step (2) was heated to 800° C. at a heating rate of 10° C./minute in a nitrogen gas atmosphere to conduct a thermogravimetric analysis (TG). Also, differential thermal analysis (DTA) was conducted in the air. The results of the thermogravimetric analysis are shown in FIG. 2.

Figure 2:
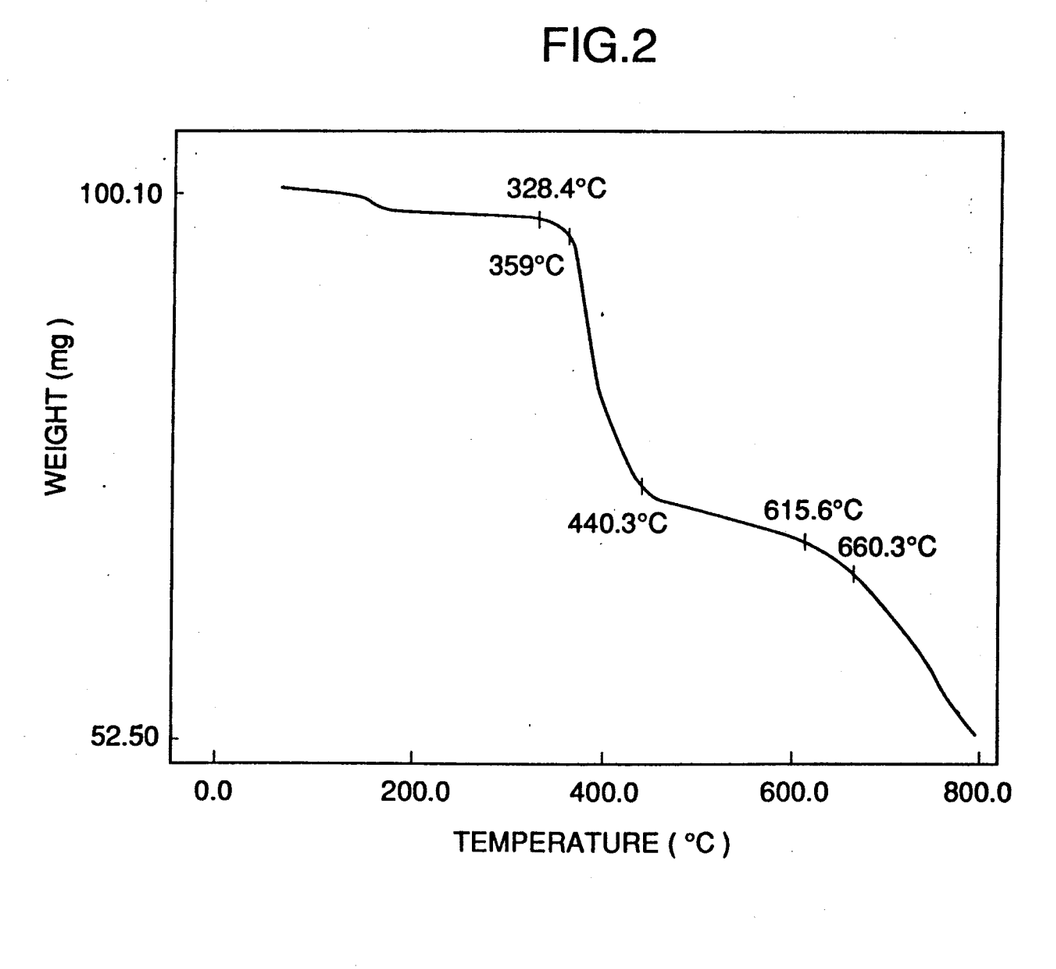
FIG. 2 is a chart showing the thermogravimetric analysis result of the product obtained by a polymerization reaction between an alkyl group-substituted aromatic diaminodithiol compound and a dicarboxylic acid derivative in Example 3.

It is clear from FIG. 2 that the prepolymer starts to lose its weight at about 320° C., and the weight decrease terminates at about 440° C. it was confirmed from DTA that a reaction causing the weight decrease is an endothermic reaction.

Figure 3:
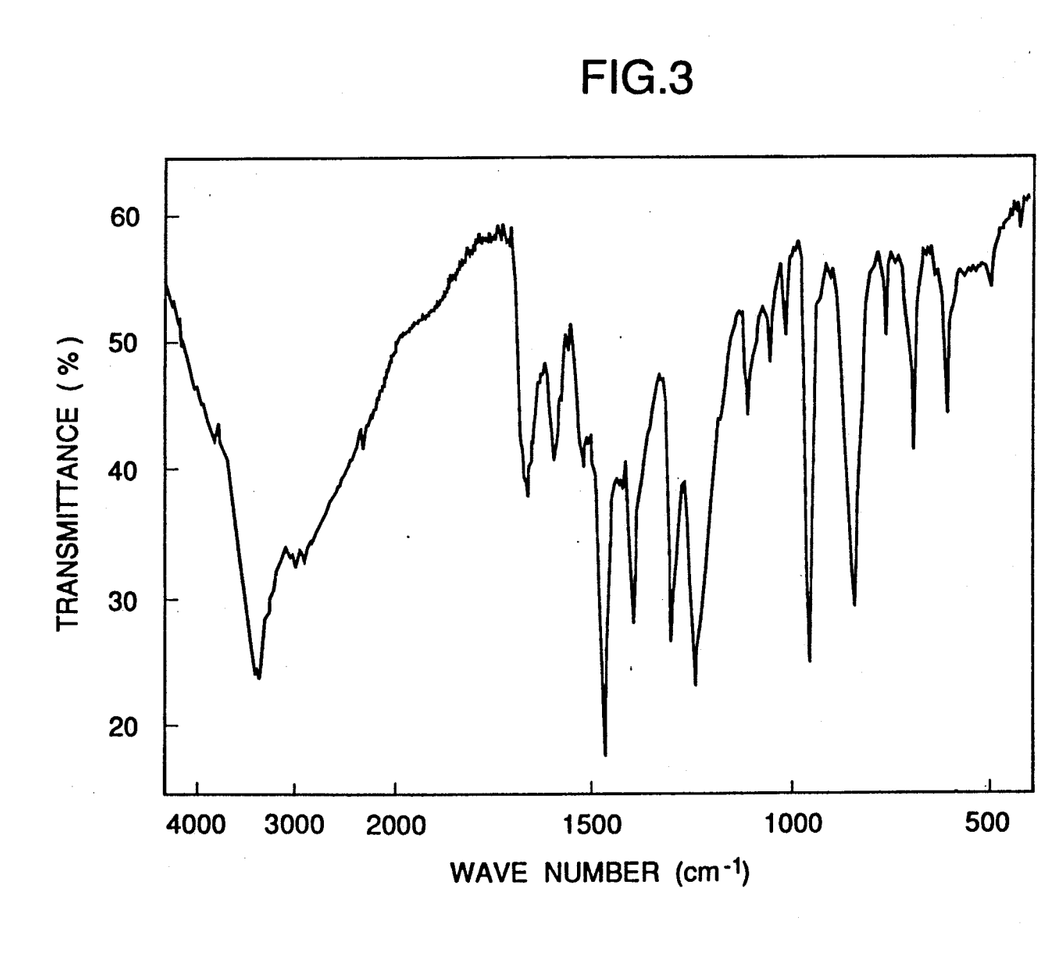
FIG. 3 is chart showing the infrared spectrum of a material obtained by heating at 420° C. for 60 minutes the product obtained by a polymerization reaction between an alkyl group-substituted aromatic diaminodithiol compound and a dicarboxylic acid derivative in Example 3.

To investigate the structural change of the prepolymer by heating, the prepolymer was heated at 420° C. for 60 minutes in a nitrogen gas atmosphere, and then subjected to an IR measurement. The results are shown in FIG. 3.

The IR measurement results after heating were extremely different from those before heating (IR measurement results of prepolymer of poly-p-phenylenebenzobisthiazole: FIG. 1).

Next, the IR measuremental results (FIG. 3) after heating were compared with those of poly-p-phenylenebenzobisthiazole synthesized by a polyphosphoric acid method, and it was confirmed that they were substantially the same. This means that the resulting compound was poly-p-phenylenebenzobisthiazole.

A sample (poly-p-phenylenebenzobisthiazole) heated at 420° C. for 60 minutes was again subjected to a TG measurement. As a result, weight reduction at about 670° C. was observed. The temperature at which a 10%-weight reduction took place was 744° C. It was verified from the TG curve that the thermal decomposition initiation temperature of poly-p-phenylenebenzobisthiazole was 670.6° C.

EXAMPLE 4

An alkyl group-substituted aromatic diaminodithiol compound monomer (2,5-diamino-1,4-diisopropylthiobenzene) was synthesized in the same manner as in the step (1) in Example 3.

1.0000 g of this monomer was then added to 7.8 ml of NMP having a lithium chloride concentration of 5% at room temperature.

The resulting solution was cooled by a dry ice/acetone mixture, and 0.7917 g of isophthalic acid chloride was added thereto. The solution was gradually heated to 0° C., and after 2 hours, 10 ml of a solvent (NMP containing lithium chloride) was added.

Next, the solution was slowly poured to methanol. After stirring, filtration was conducted, and the resulting polymer was dried. Its yield was 1.46 g, amounting to 96.9%. This polymer had an intrinsic viscosity $\eta_{inh}$ of 1.12 (dl/g). Incidentally, the measurement of an intrinsic viscosity was conducted in NMP having a lithium chloride concentration of 3% at a polymer concentration of 0.5 g/dl by an Ubbelode's viscometer.

Next, the elemental analysis of this polymer was conducted. The results are shown below.

| | Elemental Analysis: $C_{20}H_{22}S_2N_2O_2$ | | | | |
|---|---|---|---|---|---|
| Element | C | H | S | N | O |
| Calculation | 62.15 | 5.74 | 16.59 | 7.25 | 8.27 |
| Measurement | 61.44 | 5.56 | 16.25 | 7.03 | 9.72 |

This polymer was dissolved in a solvent again and cast to form a film. The resulting film was transparent and identified by an IR analysis as a desired one.

EXAMPLE 5

An alkyl group-substituted aromatic diaminodithiol compound monomer (2,5-diamino-1,4-diisopropylthiobenzene) was synthesized in the same manner as in the step (1) in Example 3.

0.5000 g of this monomer was then added to 9.75 ml of an NMP solution at room temperature in a nitrogen gas atmosphere.

The resulting solution was cooled by a dry ice/acetone mixture, and 0.5755 g of 4,4'-diphenylether dicarboxylic acid chloride was added thereto. The solution was gradually heated to 0° C. while heating. After the solution became viscous while being kept uniform and transparent, it was further heated to room temperature. After 2 hours, 10 ml of a solvent (NMP) was added.

Next, the solution was slowly poured to methanol. After stirring, filtration and drying were conducted in the same manner as in Example 3. The resulting polymer had an intrinsic viscosity $\eta_{inh}$ of 0.5 (dl/g).

This polymer was dissolved in NMP again and cast to form a film. The resulting film was transparent and identified by an IR analysis as a desired one.

As described above in detail, in the method of the present invention, an aromatic diaminodithiol compound, hydrogen atoms of whose thiol groups are in advance substituted with alkyl groups is used, and this alkyl group-substituted aromatic diaminodithiol compound is polymerized with a dicarboxylic acid derivative. Accordingly, the thiol groups are protected by alkyl group, permitting the dicarboxylic acid derivative to react selectively with amino groups. Thus, without producing an insoluble by-products, a prepolymer having a structure in which the amino groups of the aromatic diaminodithiol compound are bonded with the dicarboxylic acid derivative can be formed without fail.

Particularly, by using, as alkyl groups to be bonded to the thiol groups, those having a carboxyl group, an ester group, a cyano group and a benzyl group, etc., the ring closure reaction of the prepolymer can be achieved at a low temperature.

The aromatic polythiazole obtained by the method of the present invention have excellent properties such as mechanical strength, heat resistance, solvent resistance, etc., so that they can be used as high-strength, high-heat resistance engineering plastics for automobile parts, aircraft parts, etc.

Further, the aromatic polythiazole prepolymer obtained as an intermediate product in the method of the present invention can be used to produce excellent molecular composite materials.

What is claimed is:

1. A method of producing an aromatic polythiazole from a salt of an aromatic diaminodithiol compound and an aromatic dicarboxylic acid derivative, comprising the steps of:
   (a) reacting said aromatic diaminodithiol compound salt with an alkyl halide having a substituted or unsubstituted alkyl group in an alkaline aqueous solvent, so that hydrogen atoms in thiol groups of said aromatic diaminodithiol compound are substituted with said alkyl groups;
   (b) polymerizing the resulting alkyl group-substituted aromatic diaminodithiol compound with said aromatic dicarboxylic acid derivative to form an aromatic polythiazole prepolymer; and
   (c) heating said aromatic polythiazole prepolymer to cause a thiazole ring closure reaction, thereby producing said aromatic polythiazole.

2. The method according to claim 1, wherein said alkyl halide is a halide having a substituted or unsubstituted secondary alkyl group.

3. The method according to claim 1, wherein the alkyl group of said alkyl halide has a substituent group selected from the group consisting of a carboxyl group, an ester group, a cyano group and a benzyl group.

4. The method according to claim 1, wherein said alkyl group-substituted aromatic diaminodithiol compound and said dicarboxylic acid derivative are polymerized at a temperature between −20° C. and +50° C.

5. The method according to claim 2, wherein said alkyl group-substituted aromatic diaminodithiol compound and said dicarboxylic acid derivative are polymerized at a temperature between −20° C. and +50° C.

6. The method according to claim 3, wherein said alkyl group-substituted aromatic diaminodithiol compound and said dicarboxylic acid derivative are polymerized at a temperature between −20° C. and +50° C.

7. The method according to claim 1, wherein said aromatic dicarboxylic acid derivative is terephthalic acid dichloride.

8. The method according to claim 1, wherein said aromatic polythiazole prepolymer is heated at 250°–500° C. to form a thiazole ring, thereby producing said aromatic polythiazole.

9. The method according to claim 1, wherein the alkyl group of said alkyl halide is an unsubstituted alkyl group selected from the group consisting of an isopropyl group, an ethyl group, an n-propyl group, an n-butyl group, a sec-butyl group and a tert-butyl group.

10. The method according to claim 1, wherein the alkyl group of said alkyl halide is selected from the group consisting of:

11. The method according to claim 1, wherein the alkyl group of said alkyl halide contains 2-5 carbon atoms.

12. The method according to claim 2, wherein the alkyl group of said alkyl halide is an unsubstituted isopropyl group.

* * * * *